United States Patent Office 2,932,723
Patented Apr. 12, 1960

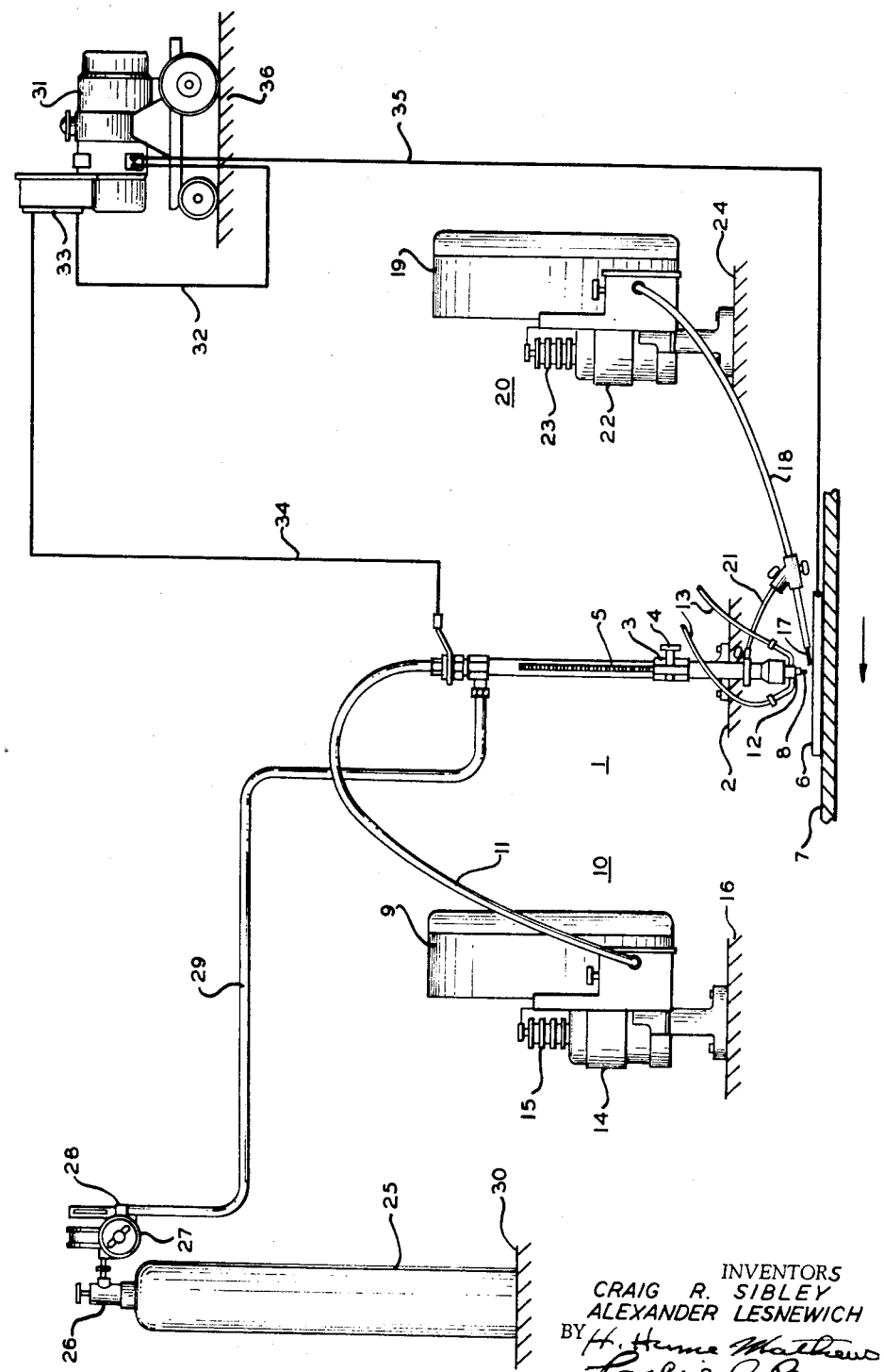

2,932,723
ELECTRIC ARC WELDING

Craig Richard Sibley and Alexander Lesnewich, New Providence, N.J., assignors to Air Reduction Company, Incorporated, New York, N.Y., a corporation of New York Application December 24, 1958, Serial No. 782,966

9 Claims. (Cl. 219—74)

This invention relates to consuming electrode electric arc welding in an oxidizing atmosphere and more particularly to consuming electrode electric arc welding of ferrous materials in a gas shielding atmosphere of carbon dioxide.

The oxidizing gas carbon dioxide has been suggested, and is being used, for the shielding of consumable electrode welding arcs. For the welding of steel, carbon dioxide is a relatively non-reactive gas and has proved to be a satisfactory medium for the exclusion of the ambient air from the vicinity of the weld. In the usual arrangement, a flowing stream of carbon dioxide is supplied about the arcing end of the electrode and the molten portions of the workpiece from the nozzle of a welding tool through which the electrode is fed as it is consumed in the welding arc established between it and the workpiece.

In a carbon dioxide gas shield, the transfer of metal through the welding arc from the electrode to the workpiece is inherently globular in form and random in direction causing the arc to be wild and unstable and causing the gas shield to be disrupted. The process is therefore normally characterized by the production of considerable weld spatter which adheres to the work and builds up in the nozzle of the welding tool through which the gas is supplied about the electrode which is fed therethrough.

It is therefore desirable to provide a carbon dioxide shielded welding method that will produce sound weld metal and a minimum of spatter.

Porosity in carbon dioxide shielded consuming electrode welding of ferrous materials is believed to be largely caused by the so called "rimming" reaction. The term "rimming" as used herein refers to the well known metallurgical reaction occurring in molten steel in which dissolved iron oxide is reduced by dissolved carbon to produce carbon monoxide which evolves as a gas and causes boiling or effervescing of the weld pool and the consequent formation of weld spatter. This reaction is inherent in the remelting of rimmed and semi-killed steels during welding and is promoted in all steels when the molten metal is exposed to an oxidizing atmosphere such as carbon dioxide. A detrimental amount of this evolved gas may be trapped in the weld metal when it freezes thus producing harmful porosity in the weld. It is well known that the evolution of carbon monoxide by the rimming reaction in the weld pool can be controlled by using a welding electrode of killed steel containing residual deoxidants. Killed steel wires containing a minimum of .25% of a deoxidizer metal such as silicon may provide such residual deoxidizing power.

While it is known that the porosity caused by the rimming reaction can be controlled by proper deoxidation practice, the problems created by the inherent erratic and misdirected globular type metal transfer characteristic of carbon dioxide shielded welding limit commercial application of the process. These problems include the formation of intolerable amounts of spatter and nitrogen infiltration from the ambient air because of the disruption of the carbon dioxide shield.

Accordingly it is highly desirable and has long been an objective in the art, to provide a carbon dioxide shielded consumable electrode arc welding process in which an axially directed spray type of transfer of metal from the electrode to the workpiece is achieved, instead of the globular transfer. When a spray transfer of electrode metal is obtained there is a succession of discrete metal droplets which are projected from the electrode to the workpiece without causing arc instability or short circuiting and without disturbing the shielding gas envelope about the arc. This spray transfer of weld metal will also provide a smooth, steady, stable, spatter-free arc in which the vaporized and molten weld metal is at all times shielded from the ambient air by a continuous undisturbed stream of shielding gas. Thus the achievement of such a spray transfer of metal in a carbon dioxide shielded arc will permit operation with an open arc of normal arc length. Furthermore weld spatter accumulations in the gas nozzle will be eliminated and the process can be employed with equal facility in either automatic or manual welding.

Inert gas shielded consumable electrode spray transfer arc welding, utilizing reverse polarity at high current densities and an arc shielded by an inert gas such as argon, is now well known and in widespread commercial use. This welding process, which is disclosed in Muller et al., U.S. Patent No. 2,504,868, is characterized by the high quality welds that can be produced with it in any metal and in any position manually or automatically. The success of the process can be attributed in part to the novel combination of elements which interact to produce the spray transfer of metal from the electrode to the work.

High quality spray transfer type welding has also been achieved for the welding of all metals in all positions in direct current straight polarity and alternating current inert gas shielded consumable electrode welding. Such welding processes, as disclosed and claimed in Muller U.S. Patents Nos. 2,694,763 and 2,694,764, involve the addition to the electrode, operated as an arc cathode, of additional compounds which dissociate in the inert shielding atmosphere to produce elements that cooperate with the metal of the electrode in the inert shielding atmosphere to produce the spray transfer phenomena.

In view of the results obtained in inert gas shielded arcs, it has been suggested that additional compounds be added to the carbon dioxide shielded arc, to accomplish the desired spray transfer of metal from the electrode to the workpiece. However, the electrical and chemical conditions existing in the carbon dioxide shielded arc are entirely different from those existing in the inert gas shielded arc and this probably explains the fact that an agent which will produce spray in an inert gas shielded arc may produce no beneficial effect whatsoever on metal transfer in an oxidizing atmosphere such as carbon dioxide. It has been found, however, that spatter free transfer can be obtained if certain additions are made to a rimmed steel electrode; i.e., an electrode containing iron oxide and little or no deoxidizers. Because of its inability to deoxidize the weld pool such an electrode is not in itself satisfactory for the process sought. On the other hand electrodes having sufficient residual deoxidation power do not produce spatter free transfer under the same conditions. For example, it has been determined that cesium compounds alone added to a killed or deoxidized electrode will produce no beneficial effect when welding in carbon dioxide. The presence in the electrode of deoxidizing elements such as silicon, aluminum and titanium along with manganese in percentages in excess of .25, for welding of rimmed or semi-killed steels, appears to affect adversely the spray producing action of cesium when used in an oxidizing atmosphere although the presence of these deoxidizing metals in such electrodes have no such effect in inert gas shielded metal arc welding.

An object of the present invention is to provide an arc welding method for producing sound weld deposits in rimmed or semi-killed steel workpieces, as well as in killed steel workpieces, by spatter free transfer of weld metal from a steel electrode to the workpiece in a shielding stream of carbon dioxide gas.

Another object of this invention is to secure in a carbon dioxide atmosphere the desired spray transfer of metal from a ferrous electrode to a ferrous workpiece while operating with normal arc lengths and under conditions which eliminate boiling or effervescing of the molten metal in the workpiece and the consequent production of spatter resulting therefrom.

Another object of this invention is to produce sound weld deposits in rimmed or semi-killed steel workpieces by securing a desired deoxidizing action in the pool of weld metal when circumstances require the use of electrodes containing relatively small amounts of deoxidizing elements to produce in a carbon dioxide atmosphere a spray transfer of metal from a ferrous electrode to the workpiece.

These and other objects of the invention will be pointed out or will become apparent from the following descriptions of embodiments thereof.

Extensive tests have shown that whereas cesium compounds alone added to a ferrous electrode containing residual deoxidizing agents in quantities necessary to achieve sound welds is not productive of a spray transfer of metal from the electrode to the workpiece in a shielding atmosphere of carbon dioxide, cesium compounds added to a rimmed steel electrode, which is free, or substantially free, of deoxidizing agents, or to a steel electrode containing up to .25% of a deoxidizer such as silicon will produce a spray transfer of metal from the electrode to the workpiece. According to the present invention, use is made of this discovery in order to secure a spray transfer of metal from the electrode to the workpiece and other means are employed for introducing a suitable amount of deoxidizing material into the molten weld pool to prevent a rimming action that would otherwise occur therein as a result of using such electrodes for welding rimmed or semi-killed steel workpieces. In accordance with the preferred embodiment of this invention, the deoxidizing material is introduced into the weld pool by feeding a wire of deoxidizing material such as aluminum or titanium, or a wire of weld metal coated with or containing such deoxidizing material, into the weld pool at its leading edge and into the outer portion of the arc stream established between the electrode and the workpiece. It is preferred to use a titanium or titanium bearing wire since the thin layer of slag produced thereby is more fluid, provides more adequate coverage of the weld metal and is easier to remove from the weld after the welding operation has been performed. When an aluminum wire or an aluminum bearing wire is used the slag produced thereby tends to ball up and consequently does not provide the same good coverage of the weld that is obtained from the slag resulting from feeding titanium into the weld pool.

The present invention may be performed either manually or by automatic equipment.

The accompanying drawing illustrates one form of automatic equipment that may be employed in practicing this invention.

The apparatus illustrated in the accompanying drawing is illustrative of many forms of apparatus that may be employed in practicing the instant invention. It is the same as that illustrated in Fig. 16 of Muller U.S. Patent No. 2,694,763. It is used, however, with different welding materials and in a different manner from that disclosed in this patent. It comprises automatic means for feeding a consumable electrode to a welding arc in accordance with its consumption therein, means for supplying an annular stream of shielding gas about the arcing terminal of the electrode, the arc, and the pool of molten metal formed by the arc in the workpiece, and means for feeding a "cold" or electrically de-energized auxiliary wire toward the arc and into the outer portions of the pool of molten metal formed in the workpiece by the arc.

In practicing the present invention the apparatus is particularly suited for welding a rimmed or semi-killed steel workpiece by a spray transfer of weld metal from the electrode to the workpiece in a shielding stream of carbon dioxide gas. This is accomplished by making the electrode of rimmed steel, or a steel containing less than .25% of a residual deoxidizing metal such as silicon, and providing it with a superficial coating of a cesium compound as will be described below. By obtaining a spray transfer of metal through the welding arc, the major source of weld spatter is eliminated. In order to prevent rimming action which would otherwise occur when welding rimmed or semi-killed steel with a rimmed steel electrode or an electrode containing small amounts of deoxidizing elements, the auxiliary wire feed mechanism is employed for deoxidizing the molten weld metal by feeding a wire consisting wholly or in part of a deoxidizing metal into the edge of this pool. This added deoxidizing metal is fused and added to the pool of molten steel in the workpiece in an amount sufficient to prevent boiling and effervescing of the liquid metal therein, which also is productive of weld spatter as well as the formation of pores or blowholes in the weld when this liquid metal solidifies. Preferably the added deoxidizing metal is fed into the outer portion of the welding arc at the leading edge of the pool of molten metal formed by it in the workpiece to be taken into solution by puddling with the molten metal in the pool. It is thoroughly admixed with the metal in the pool by the action of the arc on the pool.

The spray transfer of metal from the electrode to the workpiece prevents weld spatter from the arc and makes it possible to operate with an open arc which extends from 1/8" to 1/4" above the top surface of the workpiece. By preventing rimming action, boiling or effervescing of the molten weld metal does not occur and this likewise prevents weld spatter. It also results in the formation of a sound non-porous weld when the metal of the molten pool solidifies. The prevention of weld spatter in the arc and from the pool of molten weld metal insures a non-turbulent flow of shielding gas and consequently a highly effective shielding action about the arcing terminal of the electrode, the arc and the molten metal formed in the workpiece by the arc. The deoxidizing metal added by feeding the auxiliary wire to the weld pool to prevent rimming action is also productive of a slag which rises to the surface of the molten weld metal and forms a protective coating over the weld as it passes beyond the shielding provided by the non-turbulent flow of carbon dioxide gas.

More particularly the apparatus shown in the accompanying drawing comprises a gas-arc torch 1 mounted on a support 2 through the agency of a split sleeve holder 3 having a pinion gear rotatable by means of a handwheel 4. A rack 5 attached to the barrel of the gas-arc torch, constituting the welding head, is so arranged as to be engaged by the pinion gear in order to provide a vertical adjustment of the welding head relative to the workpiece 6 which is mounted on a support 7. Means, not shown, are also provided for adjusting the supports 2 and 7 relatively to one another so as to position the welding head relative to the workpiece to locate the welding arc where it is desired to obtain the welding operation. Furthermore, the supports 2 and 7 are movable relative to one another by suitable means, not shown, so as to traverse the welding arc along a desired direction of welding over the workpiece. In the particular arrangement illustrated the arrow associated with support 7 for workpiece 6 indicates its direction of movement so that the welding operation is progressing from left to the right along the workpiece 6.

A continuous length of steel electrode wire, containing less than .25% of a deoxidizing metal and having a superficial coating of a cesium compound is fed to the arc in accordance with its consumption in the arc from a reel thereof supported within the housing 9 of a motor driven electrode feed mechanism 10. The electrode wire is withdrawn from its reel and propelled through an electrode casing 11 and a longitudinal extending passageway in the welding head 1 from which it emerges from the nozzle structure 12 of the welding head. In the arrangement illustrated this nozzle is cooled by water supplied by conduits 13. The electrode is propelled by a suitable motor mechanism 14 at a speed determined by a governor 15. The electrode feed mechanism is mounted on a support 16 which may be the same as or different from the support 2 for the welding head 1. The electrode casing 18 is made flexible to accommodate the vertical adjustment of the welding head 1 on its support 2 as well as any relative displacement of the supports 2 and 16 for the welding head 1 and the electrode feed mechanism 10 if these supports are independent of one another.

A wire 17 of titanium or aluminum or a wire of weld metal coated with or containing titanium or aluminum is fed into the arc region at the welding head through a wire casing 18 from a reel thereof supported within the housing 19 of a wire feed mechanism 20. The discharge end of this wire casing is adjustably supported by a fixture 21 which is mounted on the welding head 1 at the lower portion thereof. This fixture provides an adjustment for determining where the auxiliary wire is fed relative to the welding arc and the pool of molten metal formed in the workpiece by the welding arc. Preferably this auxiliary wire is fed into the leading edge of the weld pool and into the outer portion of the welding arc established between the electrode 8 and the workpiece 6. This wire 17 is fed from its supply reel by a motor mechanism 22 provided with a governor 23 for controlling the speed at which it is fed. The auxiliary wire feed mechanism 20 is mounted on a support 24 which may be the same as or different from the support 2 for the welding head 1. The wire casing 18 is made flexible to accommodate the vertical adjustment of the welding head 1 relative to the workpiece 6 as well as any relative displacement of the supports 2 and 24 for the welding head and auxiliary wire feed mechanism if these supports are independent of one another.

Carbon dioxide shielding gas is supplied from a pressure cylinder 25 through the usual cylinder valve 26, a pressure regulator 27, a flow meter 28 and a gas conduit 29 to a passageway or passageways extending lengthwise of the welding head 1 to nozzle 12 forming part of the welding head from which it is discharged as a non-turbulent shielding envelope about the arcing terminal of the electrode, the arc established between the electrode and the workpiece, and the portions of the workpiece rendered molten by the arc. The gas cylinder 25 is mounted on a suitable support 30.

Welding current is supplied from one terminal of a direct current welding generator 31 through a conductor 32, a circuit controlling contactor 33 and a conductor 34 to a contact mechanism in the welding head 1 which engages and supplies welding current to the electrode 8 preferably in a region near its arcing terminal. The other terminal of the welding generator 31 is connected through a conductor 35 to the workpiece 6 or the support 7 therefor. In practicing the present invention the arc is preferably operated at straight polarity and consequently the electrode is connected to the negative terminal of the welding generator and the workpiece is connected to its positive terminal. The generator is mounted on a support 36.

A superficial coating of cesium compound on an electrode which is substantially free of deoxidizing metal makes it possible in a shielding gas of carbon dioxide to transfer the metal of the electrode to the weld pool as a spray providing the welding current is greater than a minimum value at which transition from globular to spray transfer occurs when the electrode is operated at negative or straight polarity. Rimming action in the pool of molten weld metal formed in a workpiece containing dissolved iron oxide and carbon in amounts productive thereof, is prevented by supplying a sufficient quantity of a deoxidizing metal such as titanium or aluminum to the weld pool where it is melted and with which it is admixed by the action of the arc on the pool. These metals and their known equivalents have in molten steel a deoxidizing power greater than that of the carbon dissolved therein and form non-gaseous oxides which will rise to the surface of the molten steel. By obtaining a spray transfer of weld metal through the arc and by preventing rimming action in the molten pool of weld metal formed in the workpiece, weld spatter is eliminated when welding in a carbon dioxide atmosphere and it is possible to weld with an open arc which may be manipulated manually or controlled automatically with equipment such as has been described above. In performing manual welding the electrode may be fed to the workpiece by using a hand gun which also supplies welding current to the electrode and a second hand gun may be used for feeding the deoxidizing wire without, of course, supplying welding current thereto. By preventing rimming action in the molten weld pool, the metal thereof is refined and solidifies without the formation of blowholes which would cause objectionable porosity in the weld. Thus, by adopting the procedure of this invention, it is possible to secure a spatter free transfer of welding metal with the economical advantage of using carbon dioxide as a shielding gas in addition to obtaining the other advantages inherent in the use of this gas such as higher speeds of welding, deeper penetrations and desirable bead contours.

The amount of spray producing cesium compound added to an electrode which is substantially free of deoxidizing metal in accordance with the present invention is not particularly critical providing a certain minimum amount of cesium is added. This minimum amount of cesium may be different for each particular wire but in practically all cases should be at least about .01% by weight of the electrode.

The preferred method of introducing the cesium compound to the arc in the present invention is by applying a superficial addition to the surface of an otherwise bare wire electrode. Such an addition may be made to the wire by first preparing the wire surface in a suitable manner to receive the cesium compound and then passing the wire so prepared through a solution or slurry of the cesium compound.

The wire may be cleaned electrolytically by passing it through a suitable acid bath which may consist of 4 pounds of chromium trioxide and 3 pounds of sulphuric acid dissolved in 7 gallons of water. Direct current of a strength of about 100 amperes is conducted through the bath between electrodes spaced lengthwise of one another on opposite sides of and along the wire in the bath. After this electrolytic cleaning, the wire is washed in water, thereafter dried, and then passed through a coating solution or slurry containing the cesium compound. When using cesium hydroxide as a coating compound about 25 grams thereof are added to each liter of water used to suspend the compound. After the wire has passed through the coating mixture, it is dried on the wire by passing the wire thus coated through a furnace or like device. The rate at which the electrode wire is passed through the cleaning, rinsing and coating operations may be at about 250 inches per minute in order to secure a suitable coating of the cesium compound thereon. The electrode wire may have the following composition: carbon .09%, manganese .46%, phosphorous .020%, sulphur .025% and silicon less than .01%. This is a capped steel electrode of SAE 1008 composition and one available source thereof is known to the trade as Arcrods No. 1.

A 1/16 inch electrode of the above composition provided with a coating as above described by passing it through a water solution containing 25 grams of cesium hydroxide per liter thereof will produce a spray deposit in a carbon dioxide atmosphere when fed at a rate of about 149 inches per minute to a 33 volt 350 ampere arc when the stickout or projection of the electrode from its current contact is about one inch. Rimming action is prevented in the pool of molten metal formed in the workpiece by feeding a 1/16 inch aluminum wire containing 5% silicon into the pool at about 20 inches per minute. If the stickout of the electrode is reduced, the feeding rate for the electrode for the same welding current will of course be reduced likewise. A 1/16 inch commercially pure titanium wire may be substituted for the aluminum wire above referred to in order to prevent rimming action in the weld pool. In each of the instances given, the welding speed is about 18 inches a minute. When an aluminum wire is used to deoxidize the weld metal, the weight thereof added to the weld pool may vary in amount from 2.8% to 5.5% of the electrode metal used. In the case of a titanium wire the amount thereof may vary from 8.5% to 9.0% of the electrode metal used.

Titanium and aluminum deoxidizing wires are used primarily because they are easily obtainable and easy to handle. Titanium and aluminum are typical of a well known group of steel deoxidizing metals which have in molten steel a deoxidizing power greater than that of the carbon dissolved therein, which have been used in steel making to prevent rimming action, and which also include the additional metals silicon, chromium, vanadium and zirconium. In view of the known equivalency of these metals for deoxidizing molten steel, it is quite obvious to those skilled in the art that any one of these additional metals could be substituted for the aluminum and titanium which have been used. These metals form with oxygen fusible slags which will rise to the surface of the molten steel. In all cases the welding electrode preferably contains manganese in a suitable percentage to form in the molten weld metal manganese sulfide and thus prevent the formation of iron sulfide in the weld which would make it red short. The invention is not limited to using cesium hydroxide as a spray producing agent since other cesium compounds will work equally well. Such compounds are cesium chloride, cesium carbonate, cesium nitrate and the like all of which will produce a desired spray deposit when applied to an electrode substantially free of deoxidizing metal for use in welding in a shielding gas of carbon dioxide.

It is of course within the scope of this invention to apply the deoxidizing metal to the weld pool in any suitable manner so long as a sufficient amount is added to the molten weld metal to prevent rimmed action therein. Depending on arcing conditions, it is desirable to use a deoxidizing wire of sufficient size so that any molten metal formed on its end by the heat of the arc will not ball up and form drops which periodically travel backward on the wire as it is fed into the weld pool. The size of the wire should be such that it fuses uniformly as it is fed into the weld pool to be taken in solution by puddling with the metal of the pool. The deoxidizing wire may be formed entirely of one of the above referred to deoxidizing metals or alloys of one or more of them and as previously pointed out these deoxidizing metals may be present as a coating, core or an alloy content of a carrier wire which will generally be of weld metal composition. It is of course possible to supply the deoxidizing metal to the weld metal by placing it along the line of welding so that it is melted and added to the weld pool in suitable quantity as the arc is traversed along the workpiece. Other such arrangements will occur to those skilled in this art.

It will be evident that as a result of this invention it has been made possible to produce spray transfer of electrode metal across an arc in a carbon dioxide atmosphere in a manner to produce sound spatter free welds. It is to be understood that while only a certain limited number of embodiments have been discussed herein the instant invention is not limited to the particular methods disclosed but may be used in other ways without departing from the spirit and scope of the invention as defined in the following claims.

We claim:
1. In the method of electric arc welding ferrous metal parts with a consumable ferrous electrode in a carbon dioxide gas atmosphere, the improvement which comprises striking an arc between the workpiece and a steel wire containing less than .25% of deoxidizing material as the welding electrode, adding to said wire a cesium compound in an amount effective to produce, at suitable arc current values, a spray transfer of molten metal from said electrode, and separately adding to the weld pool formed by said arc a strongly deoxidizing metal in an amount sufficient to prevent the formation of pores in the solidified weld metal.

2. The method of electric arc welding a workpiece of steel containing dissolved iron oxide and carbon in amounts productive of rimming action when rendered molten by a welding arc, said method comprising applying to a ferrous electrode which contains a deoxidizing material in an amount less than .25%, a superficial coating of a cesium compound containing cesium in an amount which is at least .01% by weight of said electrode, striking and maintaining an arc between said electrode and said workpiece with welding current supplied from a source of direct current, shielding the arcing terminal of said electrode, said arc, and the pool of molten steel formed in said workpiece by said arc with carbon dioxide gas, supplying welding current from said source of direct current to said electrode and said workpiece at a polarity and strength sufficient to consume said electrode by projecting molten steel from its arcing terminal to said pool of molten steel in said workpiece in the form of a spray of fine discrete droplets which are enclosed within said carbon dioxide gas, and controlling rimming action in said pool of molten steel formed in said workpiece by said arc by supplying directly to said pool at said arc for fusion into said pool a metal having in molten steel a deoxidizing power greater than that of the carbon dissolved therein and forming with oxygen a slag which rises to the surface of the molten steel.

3. The method of electric arc welding a workpiece of rimmed or semi-killed steel which comprises applying to a rimmed steel electrode a superficial coating of a cesium compound containing cesium in an amount which is at least .01% by weight of said electrode, striking and maintaining an arc between said electrode and said workpiece with welding current supplied from a source of direct current, shielding the arcing terminal of said electrode, said arc, and the pool of molten steel formed in said workpiece by said arc with a flowing stream of carbon dioxide gas, supplying welding current from said source of direct current to said electrode and said workpiece at straight polarity and at a strength sufficient to consume said electrode by projecting molten steel from its arcing terminal to said pool of molten steel in said workpiece in the form of a spray of fine discrete droplets which are enclosed within said shielding stream of carbon dioxide gas, and controlling rimming action in said pool of molten steel formed in said workpiece by said arc by supplying directly to the edge of said pool at said arc for fusion into said pool a metal having in molten steel a deoxidizing power greater than that of the carbon dissolved therein and forming with oxygen a slag which rises to the surface of the molten steel.

4. The method of electric arc welding a workpiece of rimmed or semi-killed steel which comprises applying to a rimmed steel electrode a superficial coating of a cesium compound containing cesium in an amount which is at least .01% by weight of said electrode, striking and maintaining an arc between said electrode and said workpiece with welding current supplied from a source of direct current, shielding the arcing terminal of said electrode, said arc, and the pool of molten steel formed in said workpiece by said arc with a flowing stream of carbon dioxide gas, supplying welding current from said source of direct curent to said electrode and said workpiece at straight polarity and at a strength sufficient to consume said electrode by projecting molten steel from its arcing terminal to said pool of molten steel in said workpiece in the form of a spray of fine discrete droplets which are enclosed within said shielding stream of carbon dioxide gas, and feeding slag forming steel deoxidizing metal into the outer portion of said arc and into the edge of said pool of molten steel formed in said workpiece by said arc, said metal being fused and added to said pool of molten steel in an amount sufficient to prevent the formation of blowholes in the weld formed in said workpiece upon the solidification of the molten steel of said pool.

5. The method of electric arc welding a workpiece of rimmed or semi-skilled steel which comprises striking and maintaining an arc between a rimmed steel electrode and said workpiece respectively connected to the terminals of a direct current source of welding current, supplying a shield of carbon dioxide gas about the arcing terminal of said electrode, said arc and the pool of molten metal formed in said workpiece by said arc, continually introducing into said arc at the arcing terminal of said electrode a compound of cesium, supplying welding current from said source to said electrode and said workpiece at straight polarity and at a strength sufficient to consume said electrode by projecting molten metal from its arcing terminal into said pool of molten metal in the workpiece in the form of a spray of fine discrete droplets enclosed within said gas shield, feeding said electrode at a rate corresponding to its consumption in said arc, and preventing rimming action in said pool of molten metal formed in said workpiece by said arc by supplying directly thereto at its edge and within the outer portion of said arc an amount of solid deoxidizing metal which when fused and admixed with the metal in said pool by the action of said arc on said pool prevents the formation of blowholes in the weld formed in said workpiece upon the solidification of said pool of molten metal.

6. The method of electric arc welding a workpiece of rimmed or semi-killed steel which comprises striking and maintaining an arc between a steel electrode containing less than .25% of deoxidizing metals and said workpiece respectively connected to the terminals of a direct current source of welding current, supplying a shield of carbon dioxide gas about the arcing terminal of said electrode, said arc, and the pool of molten metal formed in said workpiece by said arc, simultaneously supplying cesium to said arc and welding current at straight polarity to said electrode in amounts sufficient to produce a spray transfer of molten metal from said electrode to said pool of molten metal in said workpiece, and controlling rimming action in said pool of molten metal formed in said workpiece by said arc by supplying directly to the edge of said pool at said arc for fusion into said pool a metal selected from the group consisting of aluminum and titanium.

7. The method of electric arc welding a workpiece of rimmed or semi-killed steel which comprises applying to a rimmed steel electrode a superficial coating of a cesium compound containing cesium in an amount which is at least .01% by weight of said electrode, striking and maintaining an arc between said electrode and said workpiece with welding current supplied from a source of direct current, shielding the arcing terminal of said electrode, said arc, and the pool of molten metal formed in said workpiece by said arc with a flowing stream of carbon dioxide gas, supplying welding current from said source of direct current to said electrode and said workpiece at straight polarity and at a strength sufficient to consume said electrode by projecting molten metal from its arcing terminal into said pool of molten metal in said workpiece in the form of a spray of fine discrete droplets which are enclosed within said shielding stream of carbon dioxide gas, and feeding into the outer portion of said arc and into the edge of said pool of molten metal formed in said workpiece by said arc a wire of metal selected from the group consisting of aluminum and titanium, said wire being fused and added to said pool of molten metal in an amount sufficient to prevent boiling and effervescing thereof and the formation of blowholes in the weld formed in said workpiece upon solidification of said molten metal of said pool.

8. The method of electric arc welding a workpiece of rimmed or semi-killed steel which comprises applying to a steel electrode containing less than .25% of deoxidizing metals a superficial coating of a cesium compound containing cesium in an amount which is at least .01% by weight of said electrode, striking and maintaining an arc between said electrode and said workpiece with welding current supplied from a source of direct current, shielding the arcing terminal of said electrode, said arc, and the pool of molten metal formed in said workpiece by said arc with a flowing stream of carbon dioxide gas, supplying welding current from said source of direct current to said electrode and said workpiece at straight polarity and at a strength sufficient to consume said electrode by projecting molten metal from its arcing terminal into said pool of molten metal in said workpiece in the form of a spray of fine discrete droplets which are enclosed within said shielding stream of carbon dioxide gas, and controlling rimming action in said pool of molten metal formed in said workpiece by said arc by supplying directly to the edge of said pool at said arc for fusion into said pool a metal selected from the group consisting of aluminum and titanium.

9. The method of electric arc welding a workpiece of steel containing dissolved iron oxide and carbon in amounts productive of rimming action when rendered molten by a welding arc which comprises striking and maintaining an arc between a steel electrode containing less than .25% of deoxidizing material and said workpiece respectively connected to the terminals of a direct current source of welding current, supplying a shield of carbon dioxide gas about the arcing terminal of said electrode, said arc, and the pool of molten metal formed in said workpiece by said arc, continually introducing into said arc at the arcing terminal of said electrode a compound of cesium, supplying welding current from said source to said electrode and said workpiece at straight polarity and at a strength sufficient to consume said electrode by projecting molten metal from said electrode into said pool of molten metal in said workpiece in the form of a spray of fine discrete droplets enclosed within said gas shield, feeding said electrode at a rate corresponding to its consumption in said arc, and controlling rimming action in said pool of molten metal formed in said workpiece by said arc by supplying directly to said pool for fusion therein a metal selected from the group consisting of titanium and aluminum, said metal being fed to the leading edge of said pool and within the outer portion of said arc for melting in and admixture with the metal of said pool.

References Cited in the file of this patent

UNITED STATES PATENTS

| | | |
|---|---|---|
| 2,681,970 | Koopman | June 22, 1954 |
| 2,694,764 | Muller | Nov. 16, 1954 |
| 2,813,190 | Felmley | Nov. 12, 1957 |

FOREIGN PATENTS

| | | |
|---|---|---|
| 796,949 | Great Britain | June 25, 1958 |